No. 770,208. PATENTED SEPT. 13, 1904.
E. L. WILLIAMS.
EAR.
APPLICATION FILED MAY 2, 1904.
NO MODEL.
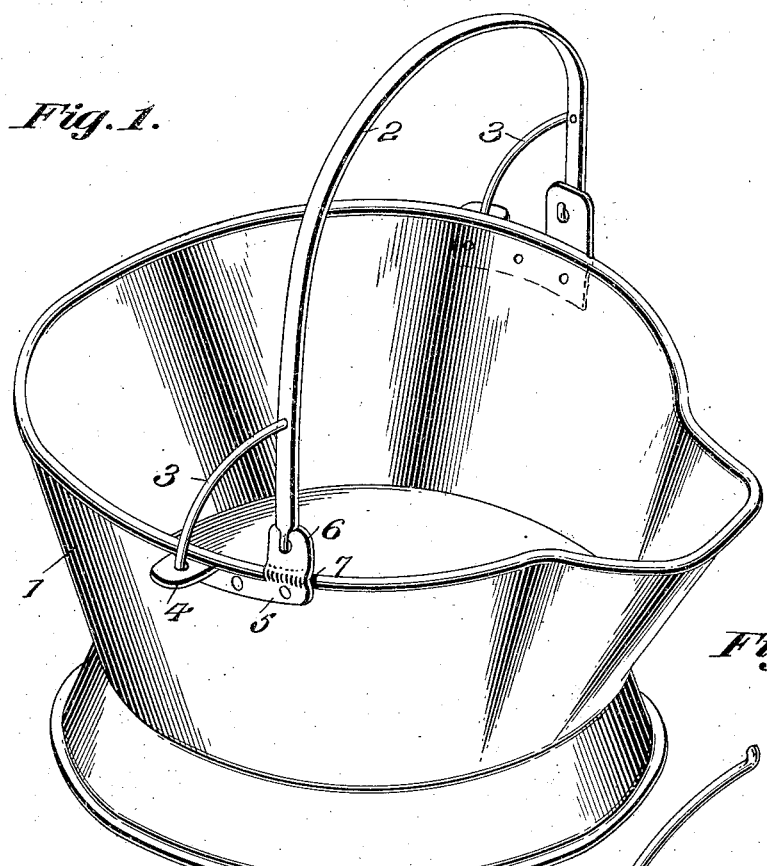
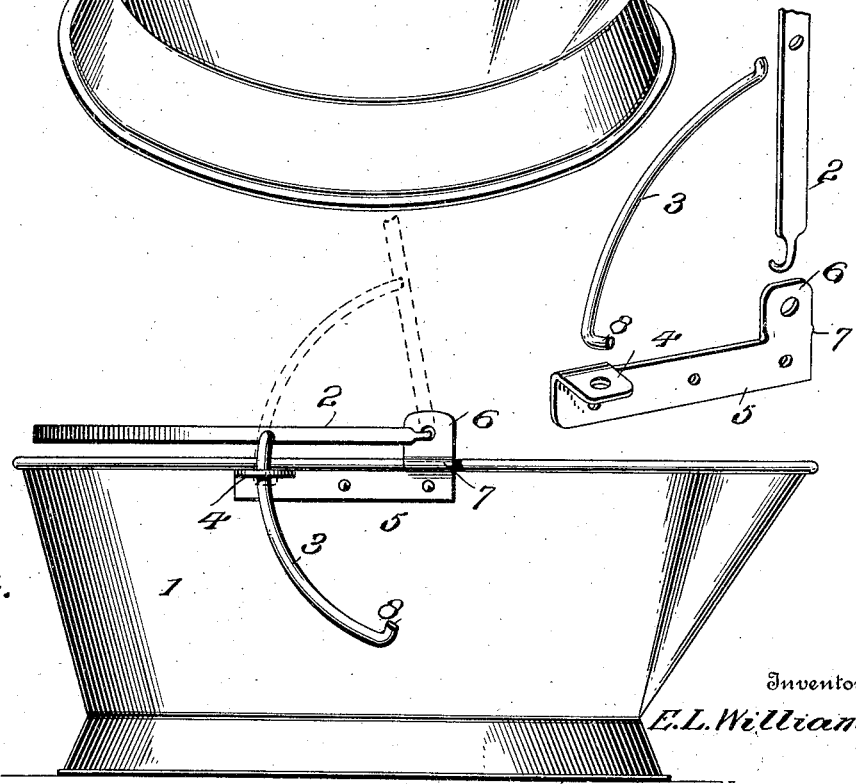

No. 770,208. Patented September 13, 1904.

UNITED STATES PATENT OFFICE.

EDMOND L. WILLIAMS, OF WEST MANSFIELD, OHIO.

EAR.

SPECIFICATION forming part of Letters Patent No. 770,208, dated September 13, 1904.

Application filed May 2, 1904. Serial No. 206,065. (No model.)

*To all whom it may concern:*

Be it known that I, EDMOND L. WILLIAMS, a citizen of the United States, residing at West Mansfield, in the county of Logan and State of Ohio, have invented certain new and useful Improvements in Ears, of which the following is a specification.

This invention provides a novel form of attachment between a coal-scuttle, pail, bucket, and like receptacle and its bail, whereby the latter is braced and the receptacle prevented from tilting either forward or rearward even though unevenly loaded. The connection is such as to admit of the bail readily folding in the accustomed manner, so as not to be in the way when the receptacle is set aside.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a coal-scuttle equipped with a bail and braces in accordance with this invention. Fig. 2 is a side view of said receptacle, the full lines showing the position of the bail and braces when said bail is folded and the dotted lines showing the relation of said parts when the bail is elevated. Fig. 3 is a detail perspective view of the ear, braces, and end portions of the bail, the parts being separated and disposed in a group.

Corresponding and like parts are referred to in the following description and indicated in all the views of the drawings by the same reference characters.

The coal-scuttle, pail, or like receptacle is indicated at 1 and may be of any pattern or construction. The bail 2 is connected to the receptacle in any accustomed manner, so as to swing and fold freely. Braces 3 are interposed between the end portions of the bail 2 and the receptacle 1 and have a running connection with the receptacle, so as not to interfere with the folding of the bail, as indicated by the full lines in Fig. 2. As shown, the braces 3 are curved and are pivotally connected at one end to the bail and are slidable with reference to the receptacle, being freely movable through openings formed in lateral extensions 4 of the ears connected to the receptacle. The ear connected to each side of the receptacle comprises a plate 5 and extensions 4 and 6, the latter being in the plane of the plate 5 and the extension 4 approximately at a right angle to said plate. The extension 6 projects above the upper edge of the receptacle and is crimped, as shown at 7, to fit about the bead or reinforced edge of the receptacle. Any suitable fastenings may be employed for attaching the ear to the receptacle, rivets being preferred. The ends of the bail 2 are formed into hooks and are passed through openings in the extensions 6. The braces 3 are curved on the arc of a circle corresponding to the pivotal connection of the bail with the receptacle, thereby admitting of the folding of the bail in the usual manner. A hook 8 is formed at the lower end of each brace 3 and is adapted to engage under the lateral extension 4 when the bail is turned into an upright position, as indicated by the dotted lines in Fig. 2.

The ears may be cast or formed of sheet metal, and the distance between the openings of the extensions 4 and 6 corresponds approximately to the distance of the connections of the braces 3 with the bail from the hooked ends thereof.

By forming the ears in the manner disclosed the bail and braces may be fitted thereto prior to attaching the ears to the receptacle. Hence the bail and adjunctive parts may be placed upon the market in completed form ready for use by attachment of the ears to the receptacle in any determinate way.

Having thus described the invention, what is claimed as new is—

In combination, a pair of ears, each consisting of a plate having extensions at opposite ends, the one in the plane of the plate and the other approximately at a right angle thereto, a bail loosely connected to the extensions in the plane of the plates, and braces connected at one end to the bail and having running connection with the extensions of the plates projected laterally therefrom, substantially as set forth.

In testimony whereof I affix my signature in presence of two witnesses.

EDMOND L. WILLIAMS. [L. S.]

Witnesses:
 L. S. WHITE,
 J. J. McGEE.